Jan. 22, 1946. W. BLITZ 2,393,228
RECORDING MAP DEVICE
Filed May 1, 1944 2 Sheets-Sheet 1
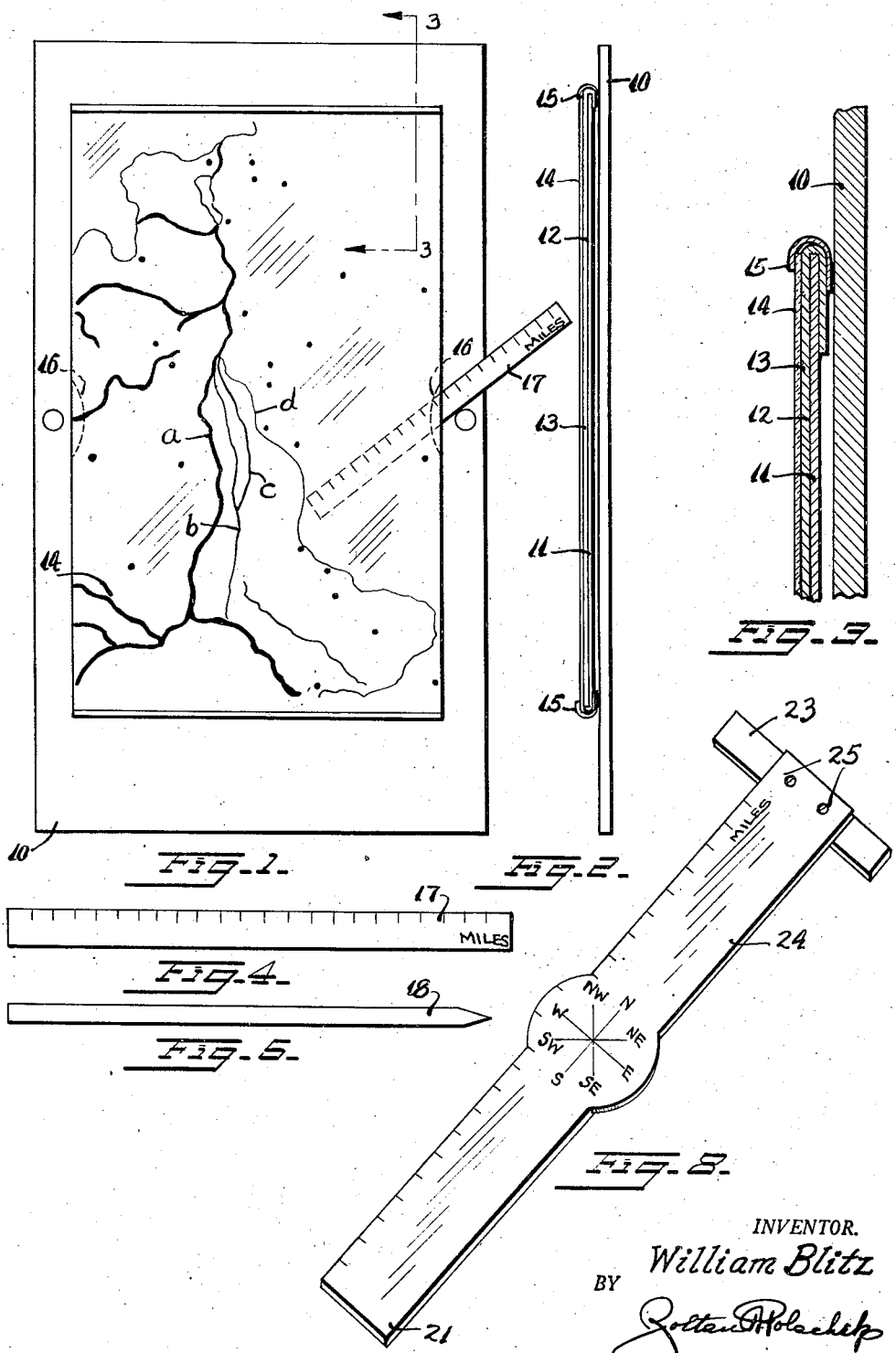
INVENTOR.
William Blitz
BY
ATTORNEY

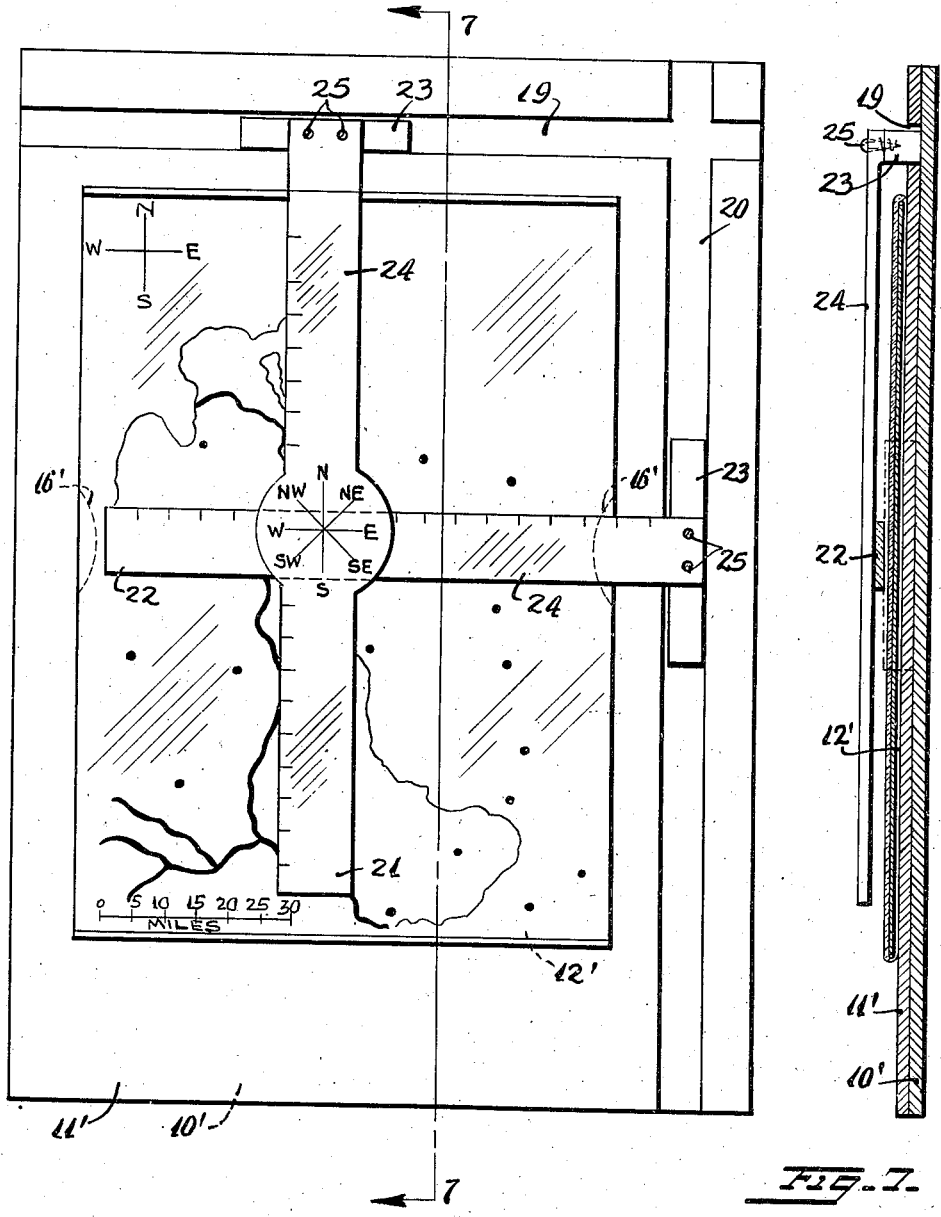

Patented Jan. 22, 1946

2,393,228

UNITED STATES PATENT OFFICE 2,393,228

RECORDING MAP DEVICE

William Blitz, New York, N. Y.

Application May 1, 1944, Serial No. 533,489

2 Claims. (Cl. 35—66)

This invention relates to new and useful improvements in map devices.

More specifically, the invention proposes the construction of a map device characterized by having a map and means for removably recording changes on the map without defacing same.

Still further it is proposed to provide a device as aforesaid having a plastic base, a thin semi-transparent map cover for the map.

Still further it is proposed to provide a device as aforesaid having movable scales and a compass for determining positions on the map.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure—

Fig. 1 is a front view of a map device constructed in accordance with this invention, two tools for employment with the map device also being shown.

Fig. 2 is a side view of the device of Fig. 1.

Fig. 3 is an enlarged section of a portion of the device of Fig. 1 taken on the line 3—3 thereof.

Figs. 4 and 5 are front views of two tools adapted to be employed with the mapping device.

Fig. 6 is a front view of a map device constructed in accordance with a modification of this invention.

Fig. 7 is a section on the line 7—7 of Fig. 6.

Fig. 8 is a perspective view of the T-square having a compass shown in Fig. 6.

The map device shown in Figs. 1-3 according to this invention, comprises a base 10 which may be a sheet of cardboard. A sheet of material 11 having an outer plastic face 12 is secured to base 10. Sheet 11 may be a sheet of cardboard having a layer of white translucent wax adhering to its outer face, or it may be a sheet of black or colored cardboard with a coating of white translucent wax. A thin semi-transparent map 13 is disposed over the sheet 11 with its printed face directed outwardly. The map may be printed, for example on semi-transparent paper, such as waxed paper or on a foil of rubber hydrochloride. Other materials suitable for the map are the following plastics or paper coated therewith: polyvinyl chloride; polyvinyl acetate; polyvinyl formal; polyvinyl alcohol. The map is covered with a flexible sheet of transparent material 14 having a smooth, glossy outer face such as Celluloid or Cellophane. The following substances provide a suitable cover plate: cellulose acetate; cellulose acetate butyrate; ethyl cellulose; regenerated cellulose; gelatine.

The three sheets of material may be fastened to the base 10 in any desired manner. In the device shown, the map is folded over the sheet 11 at the top and bottom edges and glued to the back of sheet 11, thereby leaving the entire map free from the outer face of sheet 11. Sheet 14 is secured to sheet 11 at its top and bottom edges by adhesive strips 15, thus leaving the sheet 14 entirely free from the outer face of the map. The adhesive strips are glued to the base. Thus the three sheets are secured together and to the base only at their top and bottom edges. Thus the map may not be lifted at its bottom to obliterate the lines, which must be done in a manner presently to appear.

Sheet 11 is provided with two opposite thumb slots 16 which enable a tool to be disposed between the map and the sheet 11 for a purpose presently to appear.

A ruler or tool 17 having a scale of miles printed thereon, and a pencil 18 are provided for use with the mapping device. The pencil may be merely a pointed piece of wood or Celluloid.

The operation of this form of the device is as follows:

By pressing at a point or along a line such as the line A, Fig. 1, across the outer face of the sheet 14 with the pencil 18, map 13 may be pressed against the plastic covering of sheet 11 along such point or line, and the map will adhere to the plastic covering so that the colored plastic will be visible through the semi-transparent map. Also, entirely black areas may be caused to show through the map by pressing these areas onto the plastic. When it is desired to remove certain dots, lines or areas showing through the map, it is merely necessary to lift the map away from the plastic with the tool 17, the slots 16 facilitating this operation especially by providing means for inserting the tool 17 to obliterate certain of the lines which are to be removed.

Thus the mapping device may be employed for quickly recording changes on a map without the necessity of erasing from or actually changing or defacing the map itself. For instance, suppose the map shows a country in which a war is being fought and the battle line is ever changing from day to day. As one army advances, its daily advances may be noted by successive lines such as a, b, c and d shown in Fig. 1. Then should the army retreat backwards from line d toward line c, line d can be eliminated from the map by merely inserting the tool 17 under the adjacent edge of the map and lifting it at line $d$ away from the plastic. Line $d$ is shown partly eliminated in Fig. 1. Lines $a$, $b$ and $c$ are not disturbed by this operation.

If desired, the map need not be fastened to the sheet 11 but may be loose so that it may be removed and different maps inserted thereunder. Also, if desired, the cover sheet 14 may be eliminated and the map pressed directly into the plastic by direct contact of the tool 18 with the outer face of the map.

The scale of miles on tool 17 may be employed to accurately determine the extent of advance of the aforesaid army or the change in boundary of a country.

In the modification of the invention shown in Figs. 6 and 7, the construction of the map device is similar to that previously described except that the sheet 11' having the plastic black wax coating 12' is substantially as thick as the base sheet 10' and is glued thereto, and two marginal grooves 19 and 20 are formed in sheet 11' at right angles to and intercepting each other. These grooves 19 and 20 form guideways for two T-squares 21 and 22. Each T-square includes a wooden head 23 and a transparent Celluloid ruler 24 on which a scale of miles is marked. The ruler is secured to the head by screws 25 and the head is adapted to slide in its guideway. At approximately the center of the ruler of T-square 21 (best shown in Fig. 8) there is provided a transparent compass 26 with the eight principal points of the compass marked thereon.

The operation of this form of device is substantially like the operation of the device of Figs. 1–3. The T-squares provide easily operated means for marking and determining points on the map and the compass facilitates this operation by more accurately determining directions. As the rulers and compass are transparent, they do not interfere with the complete visibility of the map.

It is to be understood that this device may also be used by students who may fill in certain missing data such as state border lines, rivers, etc., on maps which are incomplete in other respects than the indicating of cities or other fixed localities.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. A device of the type described comprising a sheet having a plastic coating and two grooves at right angles to each other, a semi-transparent map superposed on said coating, said coating and map being adapted upon impressure of said map against said coating to adhere along the lines of impressure to removably record changes on said map without defacing same, and a transparent T-square slidably mounted in each of said grooves and crossing each other.

2. A device of the type described comprising a sheet having a plastic coating and two grooves at right angles to each other, a semi-transparent map superposed on said coating, said coating and map being adapted upon impressure of said map against said coating to adhere along the lines of impressure to removably record changes on said map without defacing same, and a transparent T-square slidably mounted in each of said grooves and crossing each other, each of said T-squares including a transparent scale.

WILLIAM BLITZ.